(12) United States Patent
Lim et al.

(10) Patent No.: US 8,187,354 B2
(45) Date of Patent: May 29, 2012

(54) FILTRATION MEDIA FOR FILTERING PARTICULATE MATERIAL FROM GAS STREAMS

(75) Inventors: Hyun Sung Lim, Midlothian, VA (US); Hageun Suh, Chadds Ford, PA (US); B. Lynne Wiseman, Richmond, VA (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 13/290,515

(22) Filed: Nov. 7, 2011

(65) Prior Publication Data

US 2012/0070587 A1 Mar. 22, 2012

Related U.S. Application Data

(62) Division of application No. 11/295,864, filed on Dec. 7, 2005, now Pat. No. 8,092,566.

(51) Int. Cl.
*B01D 46/00* (2006.01)

(52) U.S. Cl. ................ 55/486; 55/487; 55/524; 55/527; 55/528; 96/416; 95/273; 95/286; 95/587

(58) Field of Classification Search .................... 55/485, 55/522, 527, 528, 486–488; 95/273, 286, 95/587; 96/416; 442/59, 79–80, 164–171, 442/361, 381; 502/400–439; 210/505, 508, 210/491

See application file for complete search history.

(56) References Cited

U.S. PATENT DOCUMENTS

2007/0163217 A1  7/2007 Frey et al.

*Primary Examiner* — Jason M Greene
*Assistant Examiner* — Karla Hawkins

(57) ABSTRACT

A composite fabric formed by depositing a web of nanofibers electroblown from a first polymer onto a first support web comprising fibers of larger average diameter than the nanofibers spun from a compatible material, in the absence of an adhesive between the webs, and solvent-bonding the webs together.

4 Claims, 2 Drawing Sheets

FILTRATION MEDIA FOR FILTERING PARTICULATE MATERIAL FROM GAS STREAMS

BACKGROUND OF THE INVENTION

1. Field of the Invention

The present invention relates to composite nonwoven fabrics suitable for use as air filtration media, for filtering particulate material from fluid streams.

2. Description of the Related Art

Filter media typically utilized for HVAC air filters that perform at efficiencies less than 99.97% at a 0.3 micron challenge are either glass, cellulose or polymer based. Filters made with media in this performance range are typically referred to as "ASHRAE filters" since the American Society of Heating, Refrigerating and Air-Conditioning Engineers writes standards for the performance of filter media in such applications. Polymer based filter media are typically spunbond or meltblown nonwovens that are often electrostatically enhanced to provide higher filtration efficiency at lower pressure drop when compared to glass or cellulose media manufactured by a wet laid paper-making process.

Electrostatically enhanced air filter media and media manufactured by the wet laid process, more specifically with the use of glass fibers, currently have limitations. Electrostatically treated meltblown filter media, as described in U.S. Pat. Nos. 4,874,659 and 4,178,157, perform well initially, but quickly lose filtration efficiency in use due to dust loading as the media begin to capture particles and the electrostatic charge thus becomes insulated. In addition, as the effective capture of particulates is based on the electrical charge, the performance of such filters is greatly influenced by air humidity, causing charge dissipation.

Filtration media utilizing microglass fibers and blends containing microglass fibers typically contain small diameter glass fibers arranged in either a woven or nonwoven structure, having substantial resistance to chemical attack and relatively small pore size. Such glass fiber media are disclosed in the following U.S. Patents: Smith et al., U.S. Pat. No. 2,797,163; Waggoner, U.S. Pat. No. 3,228,825; Raczek, U.S. Pat. No. 3,240,663; Young et al., U.S. Pat. No. 3,249,491; Bodendorf et al., U.S. Pat. No. 3,253,978; Adams, U.S. Pat. No. 3,375,155; and Pews et al., U.S. Pat. No. 3,882,135. Microglass fibers and blends containing microglass fibers are typically relatively brittle, and thus when pleated, break resulting in undesirable yield losses. Broken microglass fibers can also be released into the air by filters containing microglass fibers, creating a potential health hazard if the microglass were to be inhaled.

It would be desirable to provide a means for achieving ASHRAE level air filtration while avoiding the above-listed limitations of known filtration media.

SUMMARY OF THE INVENTION

In a first embodiment, the present invention is directed to a composite fabric comprising a web of electroblown polymeric nanofibers solvent-bonded to a first support web comprising fibers of larger average diameter than the nanofibers spun from a material compatible with said nanofibers, in the absence of an adhesive between the webs.

Another embodiment of the present invention is directed to a process for forming a composite fabric, comprising electroblowing a web of polymeric nanofibers and a solvent therefor onto a moving support web comprising larger fibers spun from a material which is compatible with said nanofiber polymer, and applying a vacuum pressure between about 4 mm $H_2O$ and 170 mm $H_2O$ to the combined webs to solvent-bond the nanofiber web to the support web.

DEFINITIONS

The term "nanofibers" refers to fibers having average diameters of less than 1,000 nanometers.

The term "filter media" or "media" refers to a material or collection of materials through which a particulate-carrying fluid passes, with a concomitant and at least temporary deposition of the particulate material in or on the media.

The term "ASHRAE filter" refers to any filter suitable for use in heating, ventilation and air conditioning systems for filtering particles from air.

The term "SN structure" refers to a multilayer nonwoven material containing a support or "scrim" (S) layer and a nanofiber (N) layer.

The term "SNS structure" refers to a multilayer nonwoven material containing a nanofiber layer sandwiched between two support layers.

DETAILED DESCRIPTION OF THE INVENTION

The invention relates to a composite nonwoven fabric suitable for use as a filter medium, comprising at least one nanofiber layer and at least one scrim layer. The nanofiber layer comprises a collection of substantially continuous organic polymeric nanofibers having diameters less than about 1 μm or 1000 nm. Such filter media can be used in filtration applications for removing particulate material from a fluid stream, in particular, particulate material from a gaseous stream such as air.

Filtration media suitable for use in air filtration applications, including ASHRAE filtration and vehicle cabin air filtration, can be made by layering one or more nanofiber layer(s) with a scrim layer to form an $SN_x$ structure, or by sandwiching one or more nanofiber layers between two scrim layers to form a $SN_xS$ structure, where x is at least one. Each nanofiber layer has a basis weight of at least about 2.5 g/m$^2$, and the total basis weight of the nanofiber layers is about 25 g/m$^2$ or more.

In the medium of the invention, the nanofiber layer has a thickness of less than about 100 μm; advantageously the thickness of the nanofiber layer is greater than 5 μm and less than 100 μm. The thickness of the nanofiber layer can vary depending on the density of the nanofiber polymer. The thickness of the nanofiber layer can be reduced without substantial reduction in efficiency or other filter properties if the solids volume fraction of the nanofiber layer is increased, such as by calendering or by collecting the nanofiber layer under high vacuum. Increasing the solidity, at constant layer thickness, reduces pore size and increases filtration efficiency.

The nanofiber layer in the present invention may be made in accordance with the barrier webs disclosed in U.S. Published Patent Application No. 2004/0116028 A1, which is incorporated herein by reference.

Figure 1:
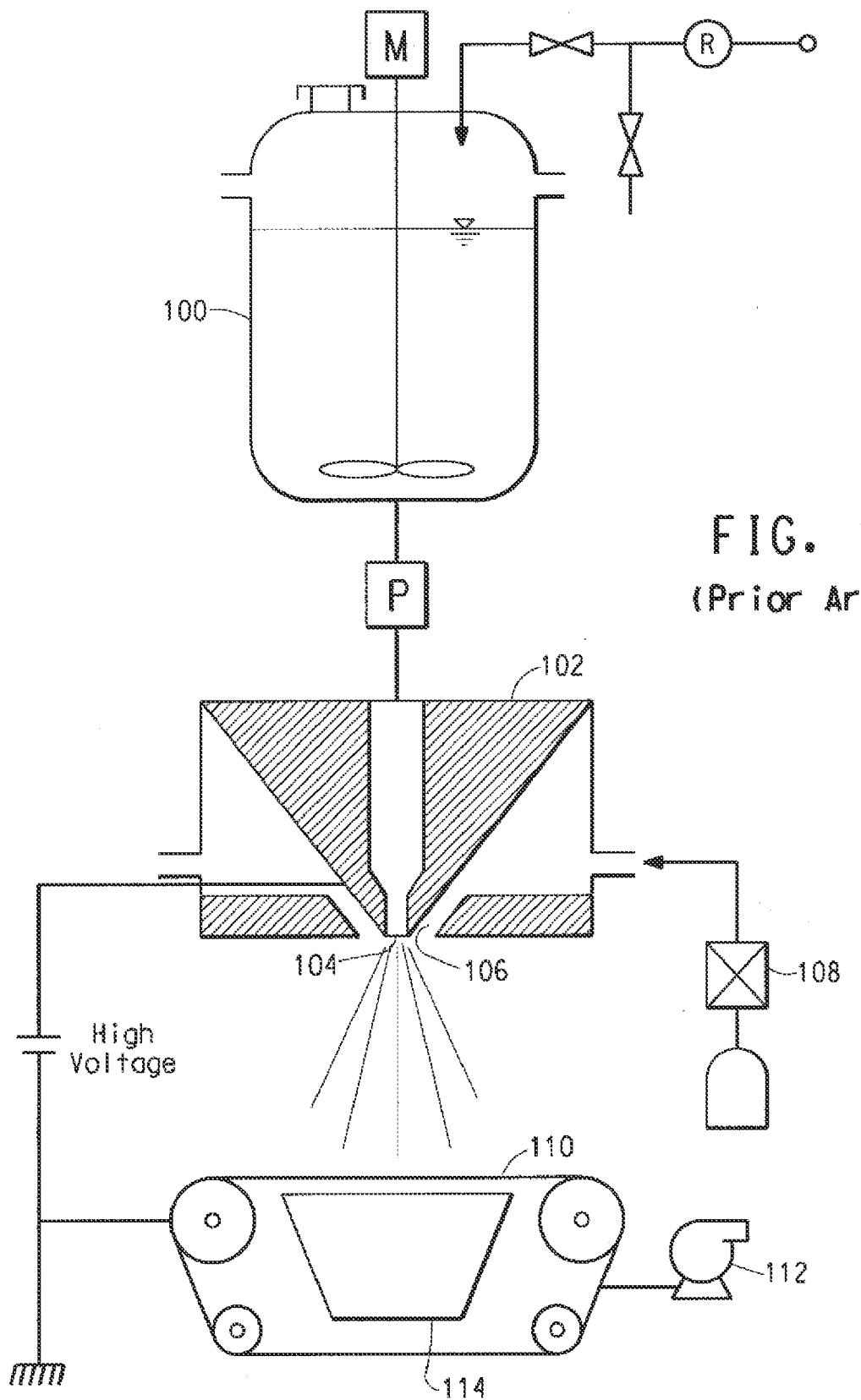
FIG. 1 is an illustration of a prior art electroblowing apparatus for forming nanofibers suitable for use in the present invention.

The nanofiber layer is made up of substantially continuous polymeric fibers having diameters less than 1000 nm, advantageously between about 100 nm and about 700 nm, or even between about 200 nm and about 650 nm, or even between about 200 nm and about 500 nm, or even between about 300 nm and 400 nm. The continuous polymeric fibers of the nanofiber layer can be formed by the electroblowing process disclosed in PCT Patent Publication Number WO 03/080905A (corresponding to U.S. Ser. No. 10/477,882, filed Nov. 20, 2002), which is incorporated herein by reference. WO 03/080905A discloses an apparatus and method for producing a nanofiber web, the apparatus essentially as illustrated in FIG. 1. The method comprises feeding a stream of polymeric solution comprising a polymer and a solvent from a storage tank 100 to a series of spinning nozzles 104 within a spinneret 102 to which a high voltage is applied through which the polymeric solution is discharged. Meanwhile, compressed air that is optionally heated in air heater 108 is issued from air nozzles 106 disposed in the sides or the periphery of spinning nozzle 104. The air is directed generally downward as a blowing gas stream which envelopes and forwards the newly issued polymeric solution and aids in the formation of the fibrous web, which is collected on a grounded porous collection belt 110 above a vacuum chamber 114, which has vacuum applied from the inlet of air blower 112.

The nanofiber layers deposited by the electroblowing process invariably have a significant quantity of the process solvent entrained therein. In previous embodiments of the composite fabric forming process, such as disclosed in U.S. Provisional Application Ser. No. 60/639,771, filed Dec. 28, 2004 and incorporated by reference herein, in most cases a nanofiber layer was first deposited, and with the aid of vacuum chamber 114, most of the entrained processing solvent was removed prior to collecting the nanofiber layer into a roll. Then the nanofiber layer was manually combined with a scrim layer by adhesive bonding to form a composite SN or SNS fabric.

It has been discovered that depositing the electroblown nanofibers and processing solvent directly onto a scrim layer, especially a scrim layer containing larger fibers made of a material which is compatible with the nanofiber polymer, permits in situ bonding of the nanofiber layer directly to the scrim, without addition of a separate adhesive between the webs.

According to the present invention, "compatible" polymers are those which are freely soluble in the processing solvent, or where the scrim polymer is at least partially soluble in or swellable with the processing solvent, or where the nanofiber and scrim polymers have relative polarities which are not so dissimilar that the polymers will not adhere to one another in the absence of a separate adhesive. The present inventors believe that the "solvent-bonding" of the present invention occurs due to a range of solvent/polymer interactions, discussed below.

Suitable polymer/solvent combinations for electroblowing are described in WO 03/080905A, and include polyamide/formic acid. The use of a scrim containing a discrete layer of polymer fibers that are compatible with the electroblown fibers will be optimal in obtaining a good solvent-bond. In one embodiment, "compatible" polymers means that the different polymer fibers are made from polymers having substantially similar chemical make-ups, i.e. made from similar combinations of monomers. For example, nylon-6 fibers can be successfully solvent-bonded to nylon-6,6 fibers with a suitable electroblowing solvent for either one of them. It is not necessary that the chemically similar fiber polymers have the same molecular weight distributions, nor that the amounts of said monomers are necessarily the same, nor that all of the monomers are identical. The relative solubility of the chemically similar polymers in the processing solvent determines the efficacy of the solvent-bonding.

According to the solvent-bonding technique of the present invention, the nanofiber polymer can be chemically different from the scrim fiber polymer, so long as the scrim fiber polymer is compatible with the nanofiber polymer, such as where the scrim fiber polymer is at least partially soluble in or swellable with the electroblowing solvent. As described above, when both the nanofiber and scrim fibers are made from the same polymer, or polymers which are soluble in the same solvent, a solvent-weld bond can be formed between the two layers, when adjacent portions of the polymer fibers co-dissolve in the electroblowing solvent, which is subsequently removed. Likewise, even if the scrim polymer is not freely soluble in the processing solvent, so long as it is swellable by said solvent, a suitable solvent-bond can be obtained. Alternatively, even when the scrim fiber material is not soluble or swellable in the electroblowing solvent, sufficient "solvent-bonding" can be obtained due to the tackiness of the solvent-swollen nanofibers adhering to the scrim fibers prior to solvent removal, so long as the two polymers have compatible relative polarities, i.e. are not too dissimilar in polarity.

Accordingly, under these circumstances, the scrim fibers can be polymers, combinations of polymer fibers and natural fibers, such as cellulose, rayon, cotton and the like, or even all natural fibers, so long as the tacky, as-spun nanofibers can successfully adhere to at least some of the scrim fibers.

For example, polyamide nanofibers electroblown in formic acid can be successfully solvent-bonded to a polyester fiber scrim according to the present invention, even though polyester is only marginally soluble, if at all, in formic acid. However, polyamide nanofibers electroblown in formic acid do not adequately adhere or bond to fibers in a polypropylene scrim, which is highly non-polar (Comparative Example B, below). Thus, nanofibers formed from relatively polar polymers are not "compatible" with highly non-polar polymer scrim fibers, such as polyolefins, within the meaning of the present invention. It has been found that electroblown polymeric nanofibers can be successfully "solvent-bonded" to scrims containing at least a portion of fibers made from natural materials, such as cellulose fibers, rayon fibers, cotton fibers and the like. Such natural fiber materials are "compatible" within the meaning of the present invention.

Examples of suitably compatible combinations of polymers/solvents include, but are not limited to polyamides, such as nylon-6, nylon-6,6, nylon-6,10 in formic acid, meta-aramid in DMAc (dimethyl acetamide) and para-aramid in sulfuric acid, polyesters, such as PET (polyethylene terephthalate), PBT (polybutylene terephthalate) and PPT (polypropylene terephthalate) in trifluoroacetic acid/methylene chloride or N-methyl-2-pyrrolidone (NMP), PAN (polyacrylonitrile) in DMF (dimethyl formamide) or DMAc, PVA (polyvinylalcohol) in water, polyurethanes in DMAc, and PVdF in DMAc or DMF. There are other suitable solvent choices for some polyamides, such as HFIP (1,1,1,3,3,3-hexaflurorisopropanol), which also dissolves PET. Those skilled in the art of polymer solubility will appreciate that by matching solubility parameters from references (such as the *CRC Handbook of Solubility Parameters and Other Cohesion Parameters* by Allan F M Barton), a range of suitable polymer/solvent electroblowing systems can be matched to scrim materials.

It is also likely that scrim layers having relatively rough surfaces will provide better bonding to the nanofiber layers than scrim layers having smooth surfaces, such as smooth bonded scrims.

Thus, according to the present invention, a composite fabric is made by solvent-bonding the nanofiber layer to the scrim by electroblowing a nanofiber layer in combination with the entrained processing solvent directly onto the substantially continuous scrim layer which is supported by the moving collection belt 110, to form an SN structure (FIG. 1).

When solvent-bonding the SN structures, it has been found that particularly robust bonding occurs when the nanofiber/solvent combination is deposited on the support layer over the vacuum chamber collector 114 at vacuum levels greater than about 60 mm $H_2O$, such as at vacuum levels from about 60 mm $H_2O$ up to about 170 mm $H_2O$, and advantageously between about 60 mm $H_2O$ to about 100 mm $H_2O$.

The composite fabric of the invention can be made by forming a nanofiber layer onto the scrim in a single pass or by building up the nanofiber layer to the desired thickness or basis weight using multiple passes, e.g., in an electroblowing process. The electroblowing process allows a nanofiber layer of suitable basis weight for use in an air filter medium to be formed in a single pass because a higher polymer solution throughput is possible than previously known in the production of nanofibers. Depending on the polymer solution flow rate and the collection belt speed, single nanofiber layers having basis weights of between about 2.5 g/m² and even up to 25 g/m² can be formed in a single pass. The benefits in efficiency of such a new process are obvious to the skilled artisan. By forming the nanofiber layer in one pass according to the present invention, less handling is required, reducing the opportunity for defects to be introduced in the final filter medium and enabling the nanofiber layer to be solvent-bonded directly to the scrim layer without interrupting the process flow. Of course, those skilled in the art will recognize that under certain circumstances it can be advantageous to use multiple electroblowing beams to deposit multiple nanofiber layers of at least about 2.5 g/m² in succession, in order to build-up the total nanofiber layer basis weight to as much as about 25 g/m² or more. Variations in the spinning conditions to modify the nanofiber laydown rate, and therefore the basis weight of a single nanofiber layer, can be made in the collection belt speed, polymer solution flow rate and even by varying the concentration of the polymer in the solution.

Figure 2:
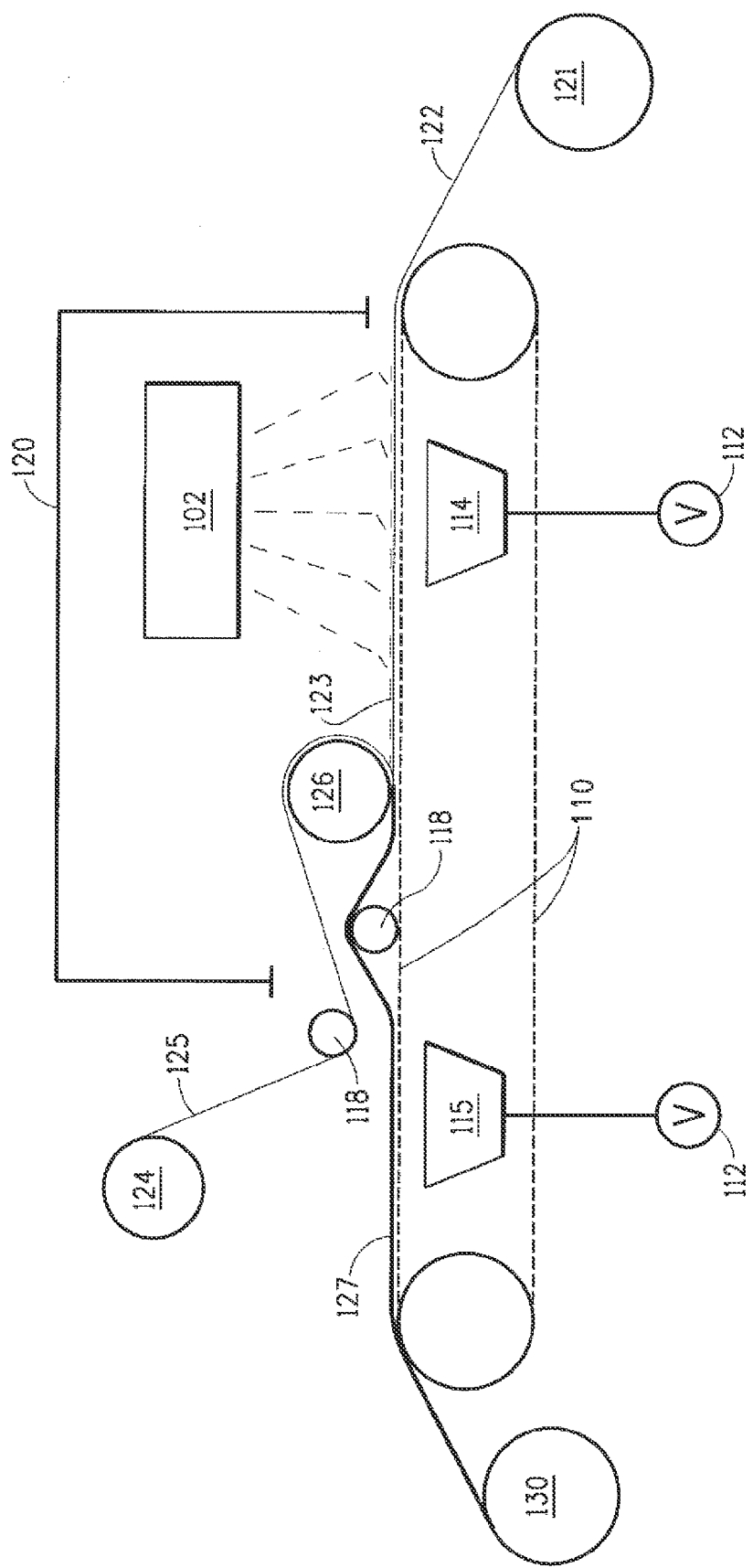
FIG. 2 is an illustration of a processing line for production of SNS solvent-bonded fabrics according to this invention.

In another embodiment of the invention, SNS composite fabrics can be formed and bonded in a continuous operation. In this embodiment (FIG. 2), a substantially continuous support or scrim layer 122 is supplied from supply roll 121 onto a moving collection belt 110 and is directed into spin cell 120 and under one or more electroblowing beams 102 to deposit one or more layers of nanofibers containing solvent onto the moving scrim, under moderate vacuum, to form an SN structure 123. The vacuum level of vacuum chamber 114 is maintained from about 4 mm $H_2O$ up to about 30 mm $H_2O$ with a vacuum blower 112, so as to aid in collection of the nanofiber layer, but not so high as to remove significant amounts of the processing solvent. Subsequently, a second scrim 125, which can be the same or different from the support scrim 122, is supplied from top scrim supply roll 124 and directed past a first tensioning roll 118, around consolidation roll 126 and deposited on top of the nanofiber layer(s) with light compression from the consolidation roll to form the multi-layered SNS composite fabric 127. The light compression acts to ensure full contact between the adjacent fabric layers to permit the solvent remaining in the nanofiber layer to soften and weld the fibers of the various layers together. The compression pressure is preferably maintained so as to ensure adequate contact and bonding between the layers, but not so high as to deform the individual fibers or to significantly reduce the overall permeability of the fabrics. Subsequently, the solvent-bonded SNS composite fabric 127 is directed over another tensioning roll 118, then over a second vacuum chamber 115, operating at higher vacuum levels to remove the remaining solvent and wound on wind up roll 130.

Those of skill in the art will recognize that the optimum vacuum levels in both vacuum chamber 114 and vacuum chamber 115 will depend largely upon the polymer/solvent combinations used in the electroblowing and bonding processes. For example, a more volatile solvent may require less vacuum in either or both stages to achieve the solvent-bonding and removal functions disclosed herein.

Advantageously, the scrim layers are spunbond (SB) nonwoven layers, but the scrim layers can be carded, wet laid, meltblown or otherwise formed and consolidated webs of nonwoven polymeric and/or natural fibers, woven polymeric and/or natural fiber fabrics and the like. The scrim layers require sufficient stiffness to hold pleats and dead folds. The stiffness of a single scrim layer is advantageously at least 10 g, as measured by a Handle-o-meter instrument, described below. Particularly high stiffness can be achieved by using an acrylic bonded carded or wet laid scrim comprising coarse staple fibers. The scrim layers may be multi-layered fabrics, such as laminates of layers of carded poly(ethylene terephthalate) (PET) fibers and carded nylon fibers, or other such multi-layer fabrics. Advantageously, the filtration medium of the invention has a total Handle-o-meter stiffness of at least 45 g, and a structure of $SN_xS$, in which at least two scrim layers contribute to the stiffness, and the number of nanofiber layers, x, is at least one. In the case of an SNS structure, the two scrim layers can be the same, or can differ as to basis weight, fiber composition or formation technique. For example, the support scrim can be a spunbond polyamide nonwoven web, onto which is deposited a polyamide nanofiber layer, and the top scrim can be a woven, carded or spunbond layer made of a third polymer, so long as the third polymer is compatible with the nanofiber polymer. Another advantageous combination of layers is an electroblown polyamide nanofiber layer solvent-bonded to a wet laid nonwoven scrim made from PET fibers, cellulose fibers, or even blends of PET and cellulose fibers. Another advantageous combination of layers is electroblown polyvinyl alcohol fibers bonded to a composite wet laid layer of PVA and rayon fibers.

The composite fabric of the invention can be fabricated into any desired filter format such as cartridges, flat disks, canisters, panels, bags and pouches. Within such structures, the media can be substantially pleated, rolled or otherwise positioned on support structures. The filtration medium of the invention can be used in virtually any conventional structure including flat panel filters, oval filters, cartridge filters, spiral wound filter structures and can be used in pleated, Z-filter, V-bank or other geometric configurations involving the formation of the medium to useful shapes or profiles. Advantageous geometries include pleated and cylindrical patterns.

The initial pressure drop (also referred to herein as "pressure drop" or "pressure differential") of the filter medium is advantageously less than about 30 mm $H_2O$, more advantageously less than about 24 mm $H_2O$. The pressure drop across a filter increases over time during use, as particulates plug the filter. Assuming other variables to be held constant, the higher the pressure drop across a filter, the shorter the filter life. A filter typically is determined to be in need of replacement when a selected limiting pressure drop across the filter is met. The limiting pressure drop varies depending on the application. Since this buildup of pressure is a result of dust (or particulate) load, for systems of equal efficiency, a longer life is typically directly associated with higher load capacity. Efficiency is the propensity of the medium to trap, rather than to pass, particulates. In general the more efficient filter media are at removing particulates from a fluid flow stream, the more rapidly the filter media will approach the "lifetime" pressure differential, assuming other variables to be held constant.

It has been discovered that the solvent-bonded composite fabrics of the present invention provide an unusual combination of fluid permeability and efficiency as compared both to conventional wet laid microglass media for air filtration application and to the adhesive bonded composites of US Provisional Application No. 60/639,771.

The filter medium of the present invention has an efficiency of at least about 20%, meaning that the medium is capable of filtering out at least about 20% of particles having a diameter of 0.3 μm in air flowing at a face velocity of 5.33 cm/sec. For use in ASHRAE filters, advantageously, the medium of the invention is capable of filtering out at least about 30% and up to about 99.97% of 0.3 μm particles in air flowing at a face velocity of 5.33 cm/sec.

The higher the air permeability of the filter medium, the lower the pressure drop, therefore the longer the filter life, assuming other variables are held constant. Advantageously, the Frazier air permeability of the filter medium of the invention is at least about 0.91 $m^3/min/m^2$, and typically up to about 48 $m^3/min/m^2$.

The filter medium of the present invention is advantageously substantially electrically neutral and therefore is much less affected by air humidity as compared with the filters disclosed in U.S. Pat. Nos. 4,874,659 and 4,178,157, described above, which owe their performances to the charges associated therewith. By "substantially electrically neutral" is meant that the medium does not carry a detectable electrical charge.

Test Methods

Filtration Efficiency was determined by a Fractional Efficiency Filter Tester Model 3160 commercially available from TSI Incorporated (St. Paul, Minn.). The desired particle sizes of the challenge aerosol particles were entered into the software of the tester, and the desired filter flow rate was set. A volumetric airflow rate of 32.4 liters/min and a face velocity of 5.33 cm/sec were used. The test continued automatically until the filter was challenged with every selected particle size. A report was then printed containing filter efficiency data for each particle size with pressure drop. Efficiencies reported in the data below are for 0.3 micrometer particle challenge only.

Pressure Drop was reported by the Fractional Efficiency Filter Tester Model 3160 commercially available from TSI Incorporated (St. Paul, Minn.). The testing conditions are described under the Filtration Efficiency test method. Pressure drop is reported in mm of water column, also referred to herein as mm $H_2O$.

Basis weight was determined by ASTM D-3776, which is hereby incorporated by reference and reported in $g/m^2$.

Thickness was determined by ASTM D177-64, which is hereby incorporated by reference, and is reported in micrometers.

Fiber Diameter was determined as follows. Ten scanning electron microscope (SEM) images at 5,000× magnification were taken of each nanofiber layer sample. The diameter of eleven (11) clearly distinguishable nanofibers were measured from the photographs and recorded. Defects were not included (i.e., lumps of nanofibers, polymer drops, intersections of nanofibers). The average fiber diameter for each sample was calculated.

Stiffness was measured using a "Handle-o-meter" instrument manufactured by Thwing Albert Instrument Co. (Philadelphia, Pa.). The Handle-o-meter measures in grams the resistance that a blade encounters when forcing a specimen of material into a slot of parallel edges. This is an indication of the stiffness of the material, which has an inverse relationship with the flexibility of the material. The stiffness is measured in both the longitudinal direction (machine direction) of the material and the transverse direction (cross-machine direction).

Frazier Permeability is a measure of air permeability of porous materials and is reported in units of $ft^3/min/ft^2$. It measures the volume of air flow through a material at a differential pressure of 0.5 inches (12.7 mm) water. An orifice is mounted in a vacuum system to restrict flow of air through sample to a measurable amount. The size of the orifice depends on the porosity of the material. Frazier permeability is measured in units of $ft^3/min/ft^2$ using a Sherman W. Frazier Co. dual manometer with calibrated orifice, and converted to units of $m^3/min/m^2$.

EXAMPLES

Example 1

Nanofiber layers were made by electroblowing a solution of nylon-6,6 polymer having a density of 1.14 g/cc (available from E. I. du Pont de Nemours and Company, Wilmington, Del.) at 24 weight percent in formic acid at 99% purity (available from Kemira Oyj, Helsinki, Finland). The polymer and solvent were fed into a solution mix tank, the solution transferred into a reservoir and metered through a gear pump to an electroblowing spin pack having spinning nozzles, as described in PCT Patent Publication No. WO 03/080905. The spin pack was 0.75 meter wide and had 76 spinning nozzles. The pack was at room temperature with the pressure of the solution in the spinning nozzles at 10 bar. The spinneret was electrically insulated and applied with a voltage of 75 kV. Compressed air at a temperature of 44° C. was injected through air nozzles into the spin pack at a rate of 7.5 $m^3$/minute and a pressure of 660 mm $H_2O$. The solution exited the spinning nozzles into air at atmospheric pressure, a relative humidity of 65-70% and a temperature of 29° C. The polymer solution throughput of the nanofiber-forming process was about 2 $cm^3$/min/hole. The fibers formed were laid down 310 mm below the exit of the pack onto a porous scrim on top of a porous belt moving at 5-12 m/minute. A vacuum chamber pulling a vacuum of 100-170 mm $H_2O$ beneath the belt assisted in the laydown of the fibers. A 40 $g/m^2$ basis weight spunbond PET nonwoven material (Finon C 3040) obtained from Kolon Company (S. Korea) was used as the scrim. The scrim had a stiffness of 35 g in the longitudinal direction and 55 g in the transverse direction.

The SN structure produced was challenged at various particle sizes for filtration efficiency and pressure drop using a TSI tester 3160, and the results are given in Table 1.

Example 2

An SN structure was made as described in Example 1, but at a higher basis weight of the nanofiber layer. The resulting structure was challenged at various particle sizes for filtration efficiency and pressure drop, and the results are given in Table 1.

TABLE 1

| Ex. No. | Nanofiber diameter (nm)* | Nanofiber basis weight (g/m$^2$) | Efficiency (%) | Pressure Drop (mm H$_2$O) | Frazier air permeability (m$^3$/m$^2$/min) |
|---|---|---|---|---|---|
| 1 | 341/387 | 3 | 69.9 | 3.7 | 37 |
| 2 | 374/362 | 5 | 85 | 6.4 | 22 |

*first measurement/second measurement

Example 3

A filtration medium having an SN structure was formed as in Example 1 by depositing a nylon nanofiber layer containing solvent, having a basis weight of about 3 g/m² on a Finon C 3070 spunbond PET scrim having a basis weight of about 70 g/m². The average diameter of the nanofibers was about 400 nm. The nanofiber web was collected on the scrim under a collector vacuum pressure of 60 mm $H_2O$ to form the composite SN fabric, and the composite fabric was passed through a dryer at 110° C. and at a vacuum pressure of 20 mm $H_2O$. The composite fabric was pleated to form a pleated filter medium. The solvent-bonding process resulted in a good bond of the nanofiber web to the scrim with no delamination and good abrasion resistance of the nanofiber layer to hand rubbing of the pleated medium. The pressure drop and the efficiency of the filtration medium before and after pleating are listed in Table 2.

Example 4

A filtration medium was formed as in Example 3, with the exception that the nanofiber layer was collected on the scrim under a collector vacuum pressure of 80 mm $H_2O$. The composite fabric was pleated to form a pleated filter medium. The solvent-bonding process resulted in a good bond of the nanofiber web to the scrim with no delamination and fair abrasion resistance to hand rubbing of the nanofiber layer of the pleated medium. The pressure drop and efficiency of the filtration medium before and after pleating are listed in Table 2.

Comparative Example A

A filtration medium was formed as in Example 3, with the exception that the nanofiber layer was collected on the scrim under a collector vacuum pressure of 40 mm $H_2O$. The composite fabric was pleated to form a pleated filter medium. The solvent-bonding process resulted in a good bond of the nanofiber web to the scrim with no delamination, but the nanofiber layer was easily abraded by hand rubbing of the pleated medium. The pressure drop and efficiency of the filtration medium before and after pleating are listed in Table 2.

Comparative Example B

A filtration medium was formed as in Example 3, with the exception that the nanofiber layer was collected on a spunbond PP scrim. No bonding was evident.

Example 5

A filtration medium was formed by depositing a nylon nanofiber layer containing solvent, having a basis weight of about 3 g/m² onto a Finon C 3070 spunbond PET scrim from Kolon Company. The nanofiber layer was collected on the scrim under a vacuum pressure of 4 mm $H_2O$, and a top scrim of a two-layer carded fabric (HDK Industries, Inc., Greenville, S.C.) was applied. The carded fabric had a layer of carded nylon fibers and a layer of carded PET fibers. The carded nylon fiber layer was directed into contact with the nylon nanofiber layer, to form a composite SNS fabric. The composite SNS fabric was passed through a consolidation nip to effect solvent-bonding of the nanofiber layer to both top and bottom scrim layers. Subsequently, the solvent-bonded composite was passed through a dryer at a temperature of 90° C. and a vacuum pressure of 20 mm $H_2O$. The composite fabric was pleated to form a pleated filter medium. The solvent-bonding process resulted in a good bond of the nanofiber web to the scrims with no delamination on handling, and only slight delamination by rubbing two layers of the pleated medium together. The pressure drop and efficiency of the filtration medium before and after pleating are listed in Table 2.

Example 6

A filtration medium was formed as in Example 5, except that the basis weight of the nanofiber layer was 5 g/m². The composite fabric was pleated to form a pleated filter medium. The solvent-bonding process resulted in a good bond of the nanofiber web to the scrims with no delamination on handling, and no delamination by rubbing two layers of the pleated medium together. The pressure drop and efficiency of the filtration medium before and after pleating are listed in Table 2.

Example 7

A filtration medium was formed as in Example 5, except that the bottom scrim was a Finon F 5070 spunbond PET scrim and the collector vacuum pressure was 5 mm $H_2O$. The composite fabric was pleated to form a pleated filter medium. The solvent-bonding process resulted in a good bond of the nanofiber web to the scrims with no delamination on handling, and only slight delamination by rubbing two layers of the pleated medium together. The pressure drop and efficiency of the filtration medium before and after pleating are listed in Table 2.

Example 8

A filtration medium was formed as in Example 7, except that the collector vacuum pressure was 10 mm $H_2O$. The composite fabric was pleated to form a pleated filter medium. The solvent-bonding process resulted in a good bond of the nanofiber web to the scrims with no delamination on handling, and no delamination by rubbing two layers of the pleated medium together. The pressure drop and efficiency of the filtration medium before and after pleating are listed in Table 2.

Example 9

A filtration medium was formed as in Example 7, except that the collector vacuum pressure was 20 mm $H_2O$. The composite fabric was pleated to form a pleated filter medium. The solvent-bonding process resulted in a good bond of the nanofiber web to the scrims with no delamination on handling, and only slight delamination by rubbing two layers of the pleated medium together. The pressure drop and efficiency of the filtration medium before and after pleating are listed in Table 2.

Comparative Example C

A filtration medium was formed by depositing a 3 g/m² layer of polyamide nanofibers on a 30 g/m² spunbond PET base scrim (Finon C 3040) according to the present invention, and a preformed 70 g/m² spunbond PET top scrim (Finon C 3040) was adhesive laminated to the nanofiber layer to form an SNS structure. The pressure drop and efficiency of the filtration medium before pleating is listed in Table 2.

Example 10

A filtration medium was formed by depositing a 3 g/m² layer of polyamide nanofibers on a 70 g/m² spunbond PET base scrim (Finon C 3040) and a 30 g/m² spunbond PET top scrim (Finon C 3040) was deposited on the nanofiber layer according to the in-line solvent-bonding process of the present invention, to form an SNS structure. The pressure drop and efficiency of the filtration medium before pleating is listed in Table 2.

TABLE 2

| Ex. No. | Medium Structure | Nanofiber basis weight (g/m$^2$) | Pre-pleat Efficiency | Pre-pleat Pressure Drop (mm H$_2$O) | Post-pleat Efficiency | Post-pleat Pressure Drop (mm H2O) |
|---|---|---|---|---|---|---|
| 3 | SN | 3 | 48.2 | 2.19 | 52.4 | 2.27 |
| 4 | SN | 3 | 40.1 | 2.08 | 54.9 | 2.43 |
| Comp A | SN | 3 | 45 | 1.2 | 55 | 2.55 |
| 5 | SNS | 3 | 41.4 | 1.57 | 38.1 | 1.68 |
| 6 | SNS | 5 | 57.4 | 2.95 | 48.1 | 2.4 |
| 7 | SNS | 3 | 37.5 | 1.21 | 35.3 | 1.68 |
| 8 | SNS | 3 | 40.3 | 1.25 | 37.8 | 1.9 |
| 9 | SNS | 3 | 38.4 | 1.51 | 34.8 | 1.57 |
| Comp C | SNS | 3 | 62.3 | 3.4 | | |
| 10 | SNS | 3 | 65.1 | 2.8 | | |

As discussed above, Comparative Example A which was deposited under only 40 mm H$_2$O vacuum, had insufficient resistance to abrasion, in contrast to Examples 3 and 4 of this invention, which demonstrated fair to good abrasion resistance. Comparative Example B that utilized a highly nonpolar PP spunbond scrim could not achieve sufficient bonding of the scrim and nanofiber layers for use as a filtration medium.

Comparative Example C, which was adhesive laminated, demonstrated reduced efficiency and increased pressure drop, as compared to the identical SNS structure of Example 10, formed according to the in-line solvent-bonding lamination process of the present invention.

We claim:

1. A process for forming a composite fabric, comprising electroblowing a web of polymeric nanofibers and a solvent therefor onto a moving support web comprising larger fibers spun from a material which is compatible with said nanofiber polymer, and applying a vacuum pressure between about 4 mm H$_2$O and 170 mm H$_2$O to the combined webs to solvent-bond the nanofiber web to the support web.

2. The process of claim 1, wherein the applied vacuum pressure is between about 60 mm H$_2$O and 170 mm H$_2$O, to form a solvent-bonded nanofiber web/support web composite fabric.

3. The process of claim 1, wherein the applied vacuum pressure is between about 4 mm H$_2$O and 30 mm H$_2$O, and further comprising depositing a second support web comprising larger fibers spun from a material which is compatible with said nanofiber polymer on said nanofiber web, to form a support web/nanofiber web/support web composite fabric, and passing said composite fabric through a consolidating nip, to solvent-bond the composite.

4. The process of claim 3, further comprising drying the solvent-bonded composite fabric under vacuum to remove the solvent.

* * * * *